H. H. CUMMINGS.
TORSION METER.
APPLICATION FILED FEB. 1, 1918.
1,369,087.
Patented Feb. 22, 1921.
3 SHEETS—SHEET 1.
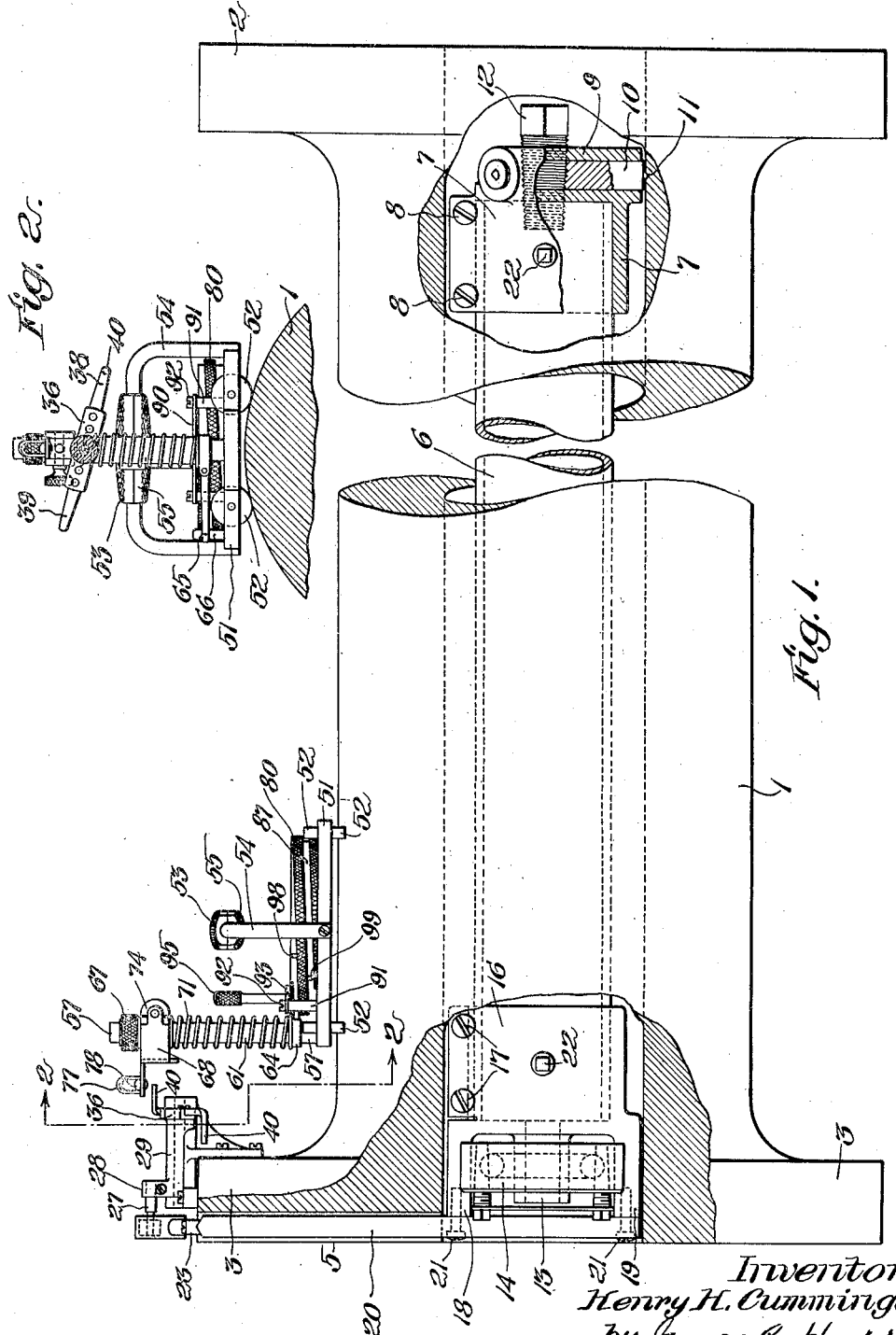
Inventor:
Henry H. Cummings,
by James R. Hodder.
Attorney.

H. H. CUMMINGS.
TORSION METER.
APPLICATION FILED FEB. 1, 1918.

1,369,087.

Patented Feb. 22, 1921.
3 SHEETS—SHEET 2.

Inventor:
Henry H. Cummings,
by James R. Hodder
Attorney.

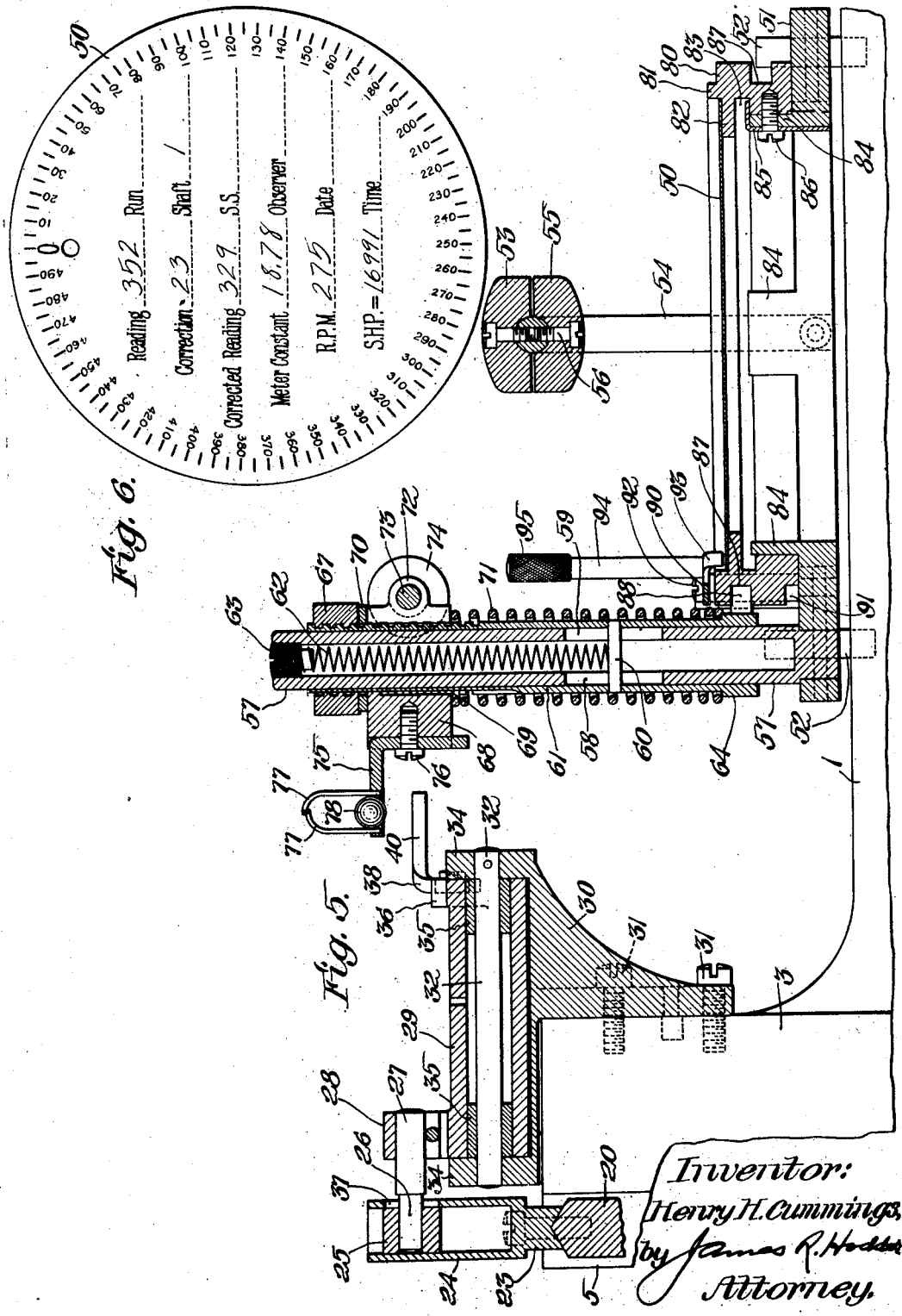

UNITED STATES PATENT OFFICE.

HENRY H. CUMMINGS, OF BOSTON, MASSACHUSETTS, ASSIGNOR OF ONE-HALF TO HOWLAND R. GARY, OF ALEXANDRIA, VIRGINIA.

TORSION-METER.

1,369,087.      Specification of Letters Patent.      Patented Feb. 22, 1921.

Application filed February 1, 1918. Serial No. 214,816.

*To all whom it may concern:*

Be it known that I, HENRY H. CUMMINGS, a citizen of the United States, and resident of Boston, in the county of Suffolk and State of Massachusetts, have invented an Improvement in Torsion-Meters, of which the following description, in connection with the accompanying drawings, is a specification, like letters on the drawings representing like parts.

The present invention is an improved apparatus for measuring the torque or twist of shafts, and is particularly valuable in measuring the twist in the propeller shafts of ships, on which to base calculations for horse power.

I have discovered that the elastic distortion of steel propeller shafts for vessels may be relied upon for the basis of accurate measurements and my prior patents upon such apparatus, or torsion meters, Nos. 1,100,691, issued June 16, 1914, and 1,227,043, issued May 22, 1917, illustrate certain of my apparatus. In these prior torsion meters, however, the apparatus was permanently installed on the shaft, or upon each shaft of a ship, and the readings and indications therefrom were made upon detachable record cards. In the usual modern construction where a plurality of propelling shafts are employed, such as in the present battleship, destroyer, or other marine craft, where a plurality of three or even more propelling shafts are installed, such prior torsion meters had to be fitted to and applied upon each shaft. Also in many types of vessels, the space for taking torsion meter readings is extremely limited, and the location of the shafting in the extreme lower part and run of the ship, rendered these readings and adjustments difficult.

My present invention is an improvement on the general type of torsion meter illustrated in my said prior patents and furthermore consists in means which require but a minimum of permanently attached devices on each shaft, an important portion of the apparatus being portable from one shaft to another during the taking of successive indications or readings. A further important feature of my present invention enables the indications or readings to be taken from a shaft while the portable apparatus is held in the most convenient and visible portion of a shaft, the operator applying the portable part of the apparatus at any point on the shaft adjacent that part of the apparatus fixed to the shaft, thus greatly facilitating the use, speed, accuracy and comfort in working in the narrow and confined spaces in a vessel where these torsion readings must be taken. Means to adjust the portable part of the apparatus to coöperate accurately with shafts of different diameters is also provided, and means for independently adjusting and correcting the indications for each shaft to be read, is provided. Further details of construction, advantages and features of the invention will be hereinafter more fully pointed out and claimed.

Referring to the drawings illustrating a preferred embodiment of the invention,

Figure 1 is a view, partly in cross section, of my present type of torsion meter applied to a shaft section;

Fig. 2 is a fragmentary end view on the line 2—2 of Fig. 1;

Figure 4:
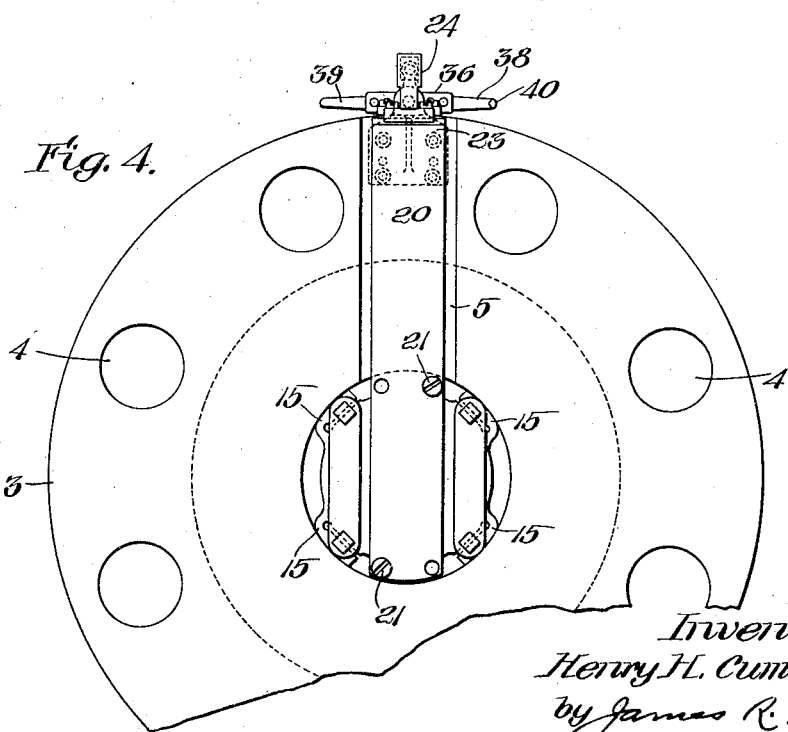

Fig. 4 being a corresponding enlarged view of that part of the apparatus fixed to the shaft which coöperates with the portable portion to produce the desired indications;

Fig. 5 is an enlarged view, partly in cross section, of the apparatus in position as shown in Fig. 1;

Fig. 6 is a view of the indicating card and specimen readings thereon.

As herein illustrated, I have shown the apparatus utilizing, for that portion of the mechanism secured to the shaft, a similar construction to that shown in my said prior Patent 1,227,043. It will be understood, however, that I may utilize any desired arrangement on the shaft portion which it is desired to measure for torque, adjusting such portion for coöperation with the portable part of my apparatus to be further described.

The usual propeller shaft section is here indicated in diagrammatic form, comprising the hollow shaft 1 with a flange 2 at the forward end and a similar flange 3 at the rear end, these flanges being bored, as indicated at 4, and are adapted for bolting adjacent shaft sections together. Such shaft sections are usually of about twenty feet in length, and to one of these sections I apply the apparatus for registering and indicating the twist of the section or a portion of the same. In the rear flange 3 I form a groove 5 extending radially from the center and then apply to this shaft section an inner rod or shaft of less diameter than that of shaft 1, this inner shaft 6 being rigidly secured to the shaft 1 at its forward end so as to take up the twist of said shaft at the forward end but being free of such twist at the rearmost end, viz., adjacent the flange 3. At the forward end of the shaft 6 I apply a collar 7, the same being clamped about the end of the shaft 6 by screws 8, 8, which collar has at its forward end a set of 3 rigidly extending guides 9, each carrying a plunger 10 with a point 11. A conical central screw 12 is adapted to throw the plungers 10 radially outward by simultaneous movement, and to force the point 11 firmly into the adjacent walls of the shaft 1, thus biting into the shaft and holding the collar 7 and this end of the rod 6 rigidly and firmly united with the shaft 1. At the rear end, adjacent the flange 3, the rod 6 has its end reduced in size, as indicated at 13, which end portion is fitted within a supporting ball bearing spider 14, said spider having a plurality of legs 15, 15, holding the same concentrically within the shaft 1. To this end also of the shaft 6 a second collar 16 is secured by clamps 17, said collar having two diametrically extending arms 18 and 19, extending beyond the legs 15 and at one side of the same, these arms 18 and 19 being in alinement with the radial slot 5 and to said arms a bar 20 is attached by screws 21, 21, which bar extends upwardly beyond the diameter of the flange 3, said bar being of sufficiently smaller size than the groove 5 to permit the slight radial movement of the bar therein. To more firmly secure the collars 7 and 16 to the shaft 6, set screws 21, 21 are applied. The construction just described is substantially similar with that shown and explained in my said prior Patent No. 1,227,043.

It will be readily appreciated that with the construction just described the shaft 6 will turn with the shaft 1, being driven by the forward end connections through the plungers 10, but said shaft 6 being free from load and without torsional strain, will not twist with the shaft 1 and consequently the differential in torsional movement will be registrable at the flange 3 between said flange and the bar 20. It is this differential which is employed in effecting the measurements for torque. To the top of the bar 20 is secured a cap 23, having a tubular portion 24 in which is a block 25, having a bored recess adapted to receive the end 26 of a pin 27 carried in the lug 28 upstanding from a short cylinder 29, mounted on a bracket 30 secured to the face of the flange 3 by bolts 31, 31. The short cylinder 29 is pivoted to said bracket by a pin 32 extending through lugs 34, 34, on said bracket, and through bearing blocks 34, 35, within the cylinder 29. This construction gives a firm and supported bearing for the short cylinder 29, insuring its easy oscillation by any movement of the pin 27 caused by its engagement with the block 25, which may be rocked by the difference in twist between the flange 3 carrying the bracket 30 and that of the opposite end portion of the shaft 1 adjacent the flange 2. At the outer end of the cylinder 29 I apply a cross member 36, carrying two corresponding and oppositely extending arms 38 and 39, each having a right-angled portion as shown at 40, one of said arms extending clear of the bracket 30, and the other pointing in the opposite direction, to give a balanced construction. It is important that all parts of the torsion meter which is under centrifugal action during the rotation of the shaft 1, should be thus counterbalanced. The operation of the parts above described will be readily understood. During rotation of the shaft 1 and with the load applied on said shaft, all torque between the forward end of the shaft 1 and the opposite end at the flange 3, will be indicated by a differential in movement between the bar 20 supported through the rod 6 at the forward end of the shaft 1 and the flange 3, adjacent said bar, said differential in movement being magnified by the relative oscillation of the cylinder 29 through its pivotal connection between the pin 27 and block 25. The block 25 readily moves upwardly and downwardly in a tubular portion 24 as the cylinder 29 oscillates, a slot 37 affording a considerable range of vertical movement for the pin 27 as shown in Fig. 5, this oscillation lifting or lowering the crossbar 36 and the right angled projections 40. Each shaft in the vessel is equipped with an apparatus thus secured to a shaft section, and the portable recording and registering device will now be described.

This portable device is adapted to be applied to each shaft, irrespective of its diameter or speed of rotation, being independently adjustable for each shaft and adapted to be held by the operator for a few moments resting upon the revolving shaft at any point in its circumference but adjacent the bracket 30. This portable device carries the indicating card 50, and consists in a carriage 51 having suitably journaled therein four wheels 52, 52, 52, 52, and a handle 53 attached to a bail 54. The operator grasps the handle 53 and positions the carriage on the shaft, the wheels 52 permitting the shaft to run freely, while the device is thus held in position resting firmly thereon. I prefer to make the handle 53 in two sections as illustrated in Fig. 5, clamping these sections 53 and 55 about the bail 54 and holding same in position by a bolt 56 as shown. At one side of the carriage 50 between a pair of wheels 52, is affixed a vertical tubular standard 57, having therethrough slots 58 and 59 to receive the pin 60 carried by a sleeve 61 adapted to slide on the outside of the standard 57. An expansible spring 62 is fitted within the standard 57 and normally forces the pin 60 downwardly, bearing between the adjusting screw 63 threaded in the top of the standard 57 and said pin 60. This sleeve 61 is provided at its lower portion with a partially encircling flange 64 and an arm 65 extending outwardly at one side to a pin 66 secured in the carriage 51, said arm 65 having a recess to provide a sliding fit for said pin 66, and thus to give a double sliding bearing for the sleeve 61, permitting it to move vertically without binding. The upper portion of said sleeve is threaded to receive a correspondingly threaded thumb nut 67 which is adapted to bear on a sliding block 68, keyed to the sleeve 61 as shown at 69, a washer 70 being preferably interposed between block 68 and said thumb nut. A coiled spring 71 encircling the sleeve and bearing between the flange 64 and said block 68 normally tends to force the block upwardly against the adjustable nut 67. Said block 68 is split at its rear, each split portion being provided with lugs 72, 72, one lug being threaded to receive the correspondingly threaded end of a bolt 73, the other end of said bolt being provided with a shouldered thumb nut 74 to permit said split portion to be quickly clamped or unclamped, about the sleeve when said block 68 is approximately in the vertical position desired. This block carries an angle iron 75, secured by a screw 76, said angle iron having at its forward overhanging arm portion a pair of cage wires 77, 77, adjacent an opening in which a ball 78 is fitted, said ball and opening being of appropriate diameter to permit the ball to drop normally below the level of the angle iron 75.

The portable device is applied to the rotating shaft 1 and moved with the ball 78 adjacent the extending portion 40 on the cylinder 29, and the device adjusted so that during the rotation of the shaft, the member 40 will just touch or strike the ball 78, making said ball jump upwardly within the cage wires 77. As the device is held stationary while the shaft rotates and as such rotation is usually at considerable speed, the result is that the ball 78 will continually dance or jump upwardly within its cage, thus giving both visual and audible evidence that the apparatus is adjusted to allow for this contact. In actual practice, however, I prefer to adjust the apparatus as just described, and then to retract the thumb nut 67 slightly, withdrawing the ball 78 from actual contact with the arm 40, then clamping the block 68, firmly, in this position and then secure the further downward adjustment of the block 68 and ball 78 until the latter comes in contact with the arm 40, by rotation of the card carrier 80, which will now be described.

Figure 3:
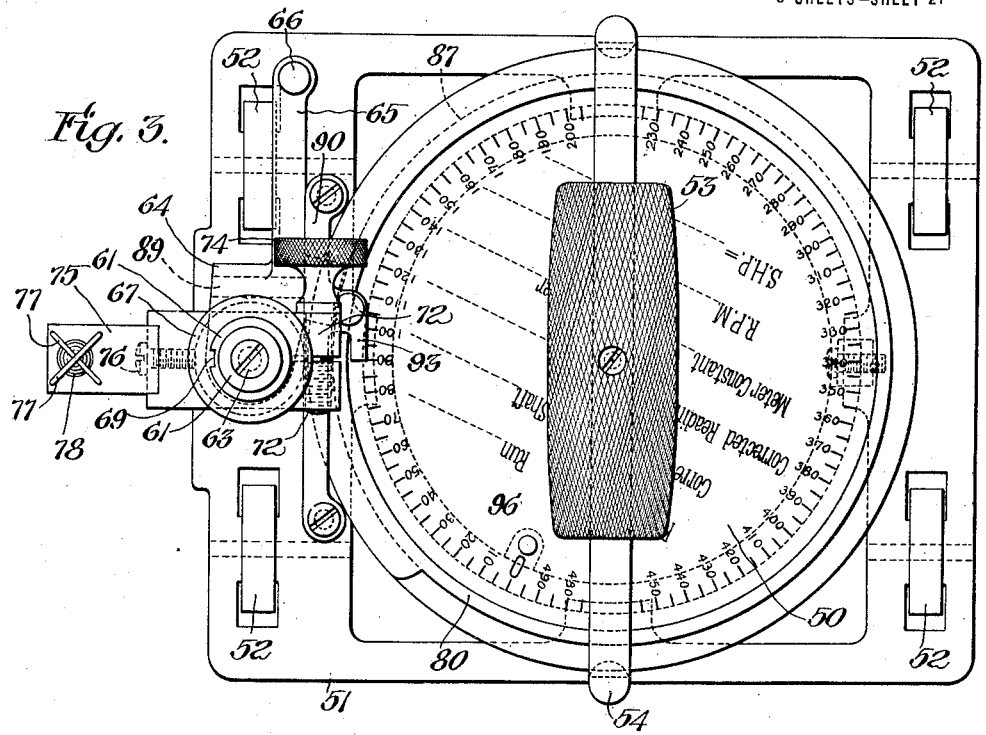
Fig. 3 is an enlarged plan view of the portable portion of the apparatus.

Mounted on the carriage 51 is a circular card carrier 80, having a top flange 81, and annular shelf 82 for the purpose of receiving and holding the card 50. On the inner diameter of the holder 80 is formed a groove 83, said holder being adapted to fit over a plurality of upstanding lugs 84, 84 (here shown as four in number), formed on the carriage 51 and spaced diametrically in pairs, an angle iron 85 being applied to one of said lugs, and held in position by a screw 86 with one flange of said angle iron engaging the groove 83, thus retaining the carrier 80 in rotatable position on the carriage 51. In the outer surface of the carrier is a cam groove 87, engaging a lug 88 extending from the flanged portion 64 of the sleeve 61. Preferably this member 88 is formed with the shank 89 adapted to fit into a correspondingly bored recess in said flange 64 adjacent the arm 65 (see Fig. 3). Rotation of the carrier 80 thus acts to raise or lower the sleeve 61, carrying the block 68 and ball 78, giving a fine adjustment, to bring said ball 78 into operative contact with the arm 40 on the shaft from which readings are to be taken. In order to mark the card 50 while taking the readings a short bracket 90 preferably of spring metal is secured to the carriage 51 by posts 91 and screws 92. The spring metal bracket 90 has a side lug 93 with the end extending downwardly (see Fig. 5) overhanging the flange 81 on the card carrier and in position so that it will, by a slight deflection of the lug and spring, register with the card 50 and make a permanent mark thereon. To effect this deflection I provide a post 94 rigidly secured to the lug 93 with a knurled top 95 to more conveniently permit the thumb of the operator to engage same and by a quick lateral movement to depress the lug 93 and make the permanent record in the card. This lug 93 is accurately positioned in alinement with the center of the carriage and diameter of the card holder and center of ball 78.

To accurately position the cards 50 in the card holder, each card has a recess opposite the zero mark, said cards having circumferential graduations from zero to five hundred, the zero recess being adapted to fit over a stud 96, the same being adjacent the topmost portion of the cam groove making one complete circle of the carrier with suitable stops 98 and 99 to limit further rotative movement of said carrier, while permitting the zero mark to turn the complete circle.

The operation of the meter will be readily understood. In order to first secure an approximate zero point, from which to reckon the torsion readings, it is desirable to apply the apparatus to each shaft and secure a correction for each shaft which remains fixed and can be deducted from all subsequent readings. For this purpose the apparatus is applied to a shaft when it is "dragging," i. e., without power applied and simply rotating as easily and as freely as possible while the ship forges ahead. In this condition, practically without appreciable twist, the apparatus is applied to the shaft, the thumb nut 67 rotated to bring the ball 78 nearly into contact with the arm 40, and with the card 50 at zero. Further adjustment of the ball 78 until it comes in contact with the arm 40 during this period when the shaft is dragging without power, is made by rotation of the carrier 80 until actual contact between the arm 40 and ball 78 is observed. In the particular reading herein illustrated, this point is reached at 23, a slight lateral movement of the lever 94 pressing the flange 93 onto the card and the resulting indication, viz., at 23—gives the correction for this particular shaft. Thereafter, with the engine rotating when the apparatus is applied for measuring torsion, the reading herein shown for the sake of example as 352, is obtained by the vertical adjustment of the block 68 and ball 78 downwardly until actual contact with the arm 40, this adjustment being secured by rotation of the carrier 80, and at the instant of contact with the rotating arm 40 will continually strike the ball 78 making it bounce or dance upwardly in its cage, a second reading is taken on the card by oscillating the lever 94, which in this instance is presumed to cut the card at the point 352 in the graduations around the periphery. It will be understood that divisional points between each of the graduations indicated in Fig. 6 are actually present on the card to give fractional readings therebetween. With this reading 352 obtained, the correction for zero, viz., 23, is deducted, resulting in a corrected reading 329. This reading is multiplied by the meter constant —which is the torsion meter constant worked out from the shop calibration of each shaft and is among the engineering data which the ship builder turns over with the ship. This quotient, multiplied by the revolutions per minute of the shaft at the time of taking the reading 352, gives the shaft horse power at that speed of rotation.

The cards with these readings may be preserved and the indentations thereon constitute a permanent record. Different corrections for each shaft are usual and being once obtained, are constant for all subsequent readings taken.

My invention is further described and defined in the form of claims as follows:

1. The combination with a portable indicating and recording apparatus for measuring the twist distortion of a predetermined length of shaft, of connections on said shaft, means operated by said connections and adapted to take a position corresponding to the twist of the shaft, and means for bringing said indicating and recording apparatus into coöperative action with the connection operated means.

2. A torsion meter of the kind described, comprising means to measure the twist distortion of a predetermined length of shaft, consisting in mechanism secured to and actuated by connections spaced on said shaft and removable indicating and recording apparatus having adjustable means to bring the indicating and recording devices into coöperative action with said shaft actuating mechanism, said removable apparatus being adapted for contact on a shaft at any point on its circumference adjacent one of said fixed connections.

3. A torsion meter of the kind described, comprising a shaft section, means having fixed connection with said shaft spaced from each other, constructed and arranged to indicate the twist distortion and automatically movable with the varying distortion of said spaced connections, a separable indicator carrying device adapted to be positioned on the shaft adjacent one of said fixed connections, said device comprising a rotatable carrier, an arm coöperating with the fixed twist actuated member, means to adjust the carrier devices for coöperating with the said member and means to effect a permanent record of the twist distortion.

4. In a torsion meter having fixed connections to a shaft, means carried by said fixed connections and adapted to operate an arm in accordance with the torque of a predetermined section of said shaft, the combination with a coöperating portable indicator and recording apparatus, said apparatus including anti-friction means permitting the shaft to rotate under said apparatus, while in contact therewith, a member on the apparatus adapted for contact with said movable lever, means to adjust the contact member toward and from said lever, means to hold the contact member in adjusted position, and means affording adjustment of the recording holder, to receive a permanent record in accordance with the indication on said contact member.

5. Torsion meter apparatus of the kind described, adapted to indicate and record the twist distortion of a plurality of rotating shafts, consisting in fixed distortion members applied to each shaft and portable indicating and recording apparatus constructed and arranged for application to each shaft, said portable apparatus having adjustable mechanism to coöperate with the fixed torsion actuated mechanism on each shaft and anti-friction supports for the portable apparatus to rest on the shaft during its rotation.

In testimony whereof, I have signed my name to this specification.

HENRY H. CUMMINGS.